United States Patent [19]

Reime

[11] Patent Number: 5,157,558
[45] Date of Patent: Oct. 20, 1992

[54] VIDEO RECORDING UNIT FEATURING SWITCHING LOGIC MEANS FOR GENERATING PHASE SHIFTING MATRIX GROUPS

[75] Inventor: Gerd Reime, Wurmberg, Fed. Rep. of Germany

[73] Assignee: Nokia Unterhaltungselektronik GmbH, Pforzheim, Fed. Rep. of Germany

[21] Appl. No.: 565,056

[22] Filed: Aug. 9, 1990

[30] Foreign Application Priority Data

Aug. 17, 1989 [DE] Fed. Rep. of Germany ....... 3927102

[51] Int. Cl.$^5$ .............................................. H04N 5/78
[52] U.S. Cl. ..................................... 360/34.1; 358/340; 358/328
[58] Field of Search ........................... 360/34.1, 33.1; 358/335, 340, 328, 39

[56] References Cited

U.S. PATENT DOCUMENTS

| | | | |
|---|---|---|---|
| 4,007,482 | 2/1977 | Amari | 358/4 |
| 4,007,484 | 2/1977 | Amari | 358/8 |
| 4,165,518 | 8/1979 | Hirai | 358/8 |
| 4,178,606 | 12/1979 | Hirota | 358/4 |
| 4,208,673 | 6/1980 | Numakura | 358/333 X |
| 4,654,726 | 3/1987 | Kluth | 360/33.1 |
| 4,862,099 | 8/1989 | Nakai | 329/126 |

Primary Examiner—Andrew L. Sniezek
Attorney, Agent, or Firm—Ware, Fressola, Van Der Sluys & Adolphson

[57] ABSTRACT

A device for recording FM signals in helical-scan tracks of a video magnetic tape has a phase shifter disposed between an FM modulator and a write-head configuration, which subjects the FM signal from the FM modulator to a phase shift. The phase shifter determines a phase shift for a luminance signal which is determined by a first phase shift P1 for a line n of a track m; a second phase shift P2 for a line n+1 of the track m; and a third phase shift P3 for the line n located in the track m+1. For the line n+1 located in the track m+1, a fourth phase shift P4 has a value determined by the other three phase shifts such that a total phase difference D between a first phase difference D1 of the fourth and the second phase shifts (D1=P4−P2) and a second phase difference D2 of the third and first phase shifts (D2=P3−P1) measures 180° (D=D1−D2=180°), whereby a cross-talk interference which in line n leads to brightening as compared to an original brightness, results in line n+1 having an offsetting equally large darkening.

5 Claims, 5 Drawing Sheets

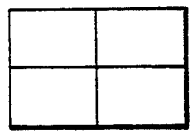
Fig. 2
Fig. 3
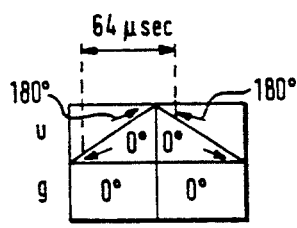
Fig. 4
Fig. 5
Fig. 6
Fig. 7
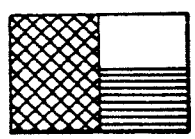
Fig. 10

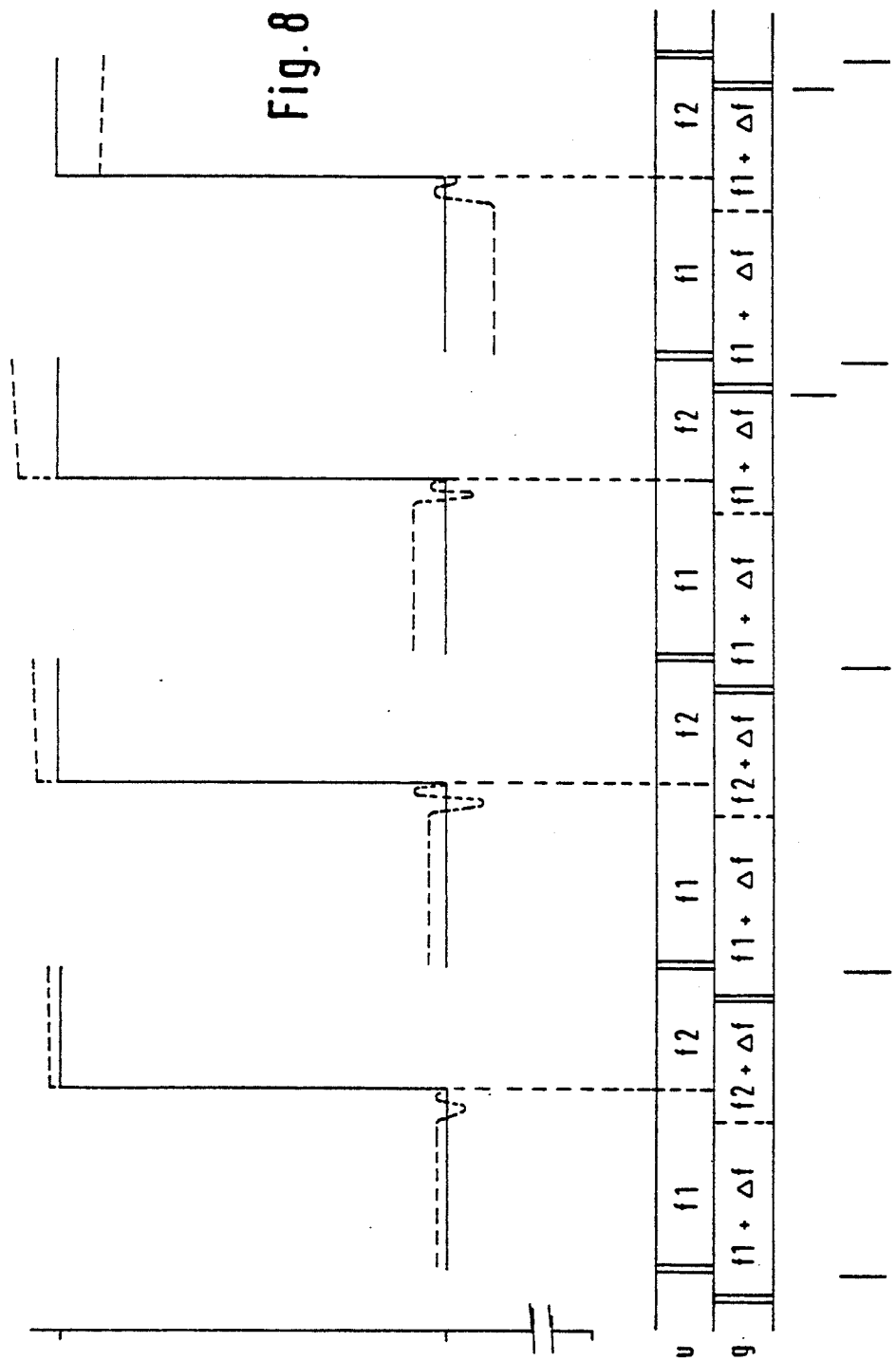

VIDEO RECORDING UNIT FEATURING SWITCHING LOGIC MEANS FOR GENERATING PHASE SHIFTING MATRIX GROUPS

BACKGROUND OF THE INVENTION

The invention relates to a video unit, namely a device for recording FM signals in helical-scan tracks of a video magnetic tape. Most recording devices of this type also incorporate a device for playing back FM signals which are recorded in the helical-scan tracks of a tape, but this is not imperative.

There exist various standards relating to the recording of signals in helical-scan tracks of a video magnetic tape. It is common to most of the standards that the amplitude-modulated luminance signal representing the contents of an image is recorded as an FM signal. During playback, the FM signal read is converted back into an amplitude-modulated luminance signal, since all analog television standards work with an amplitude-modulated luminance signal.

DESCRIPTION OF THE PRIOR ART

Conventional devices for recording FM signals in helical-scan tracks of a video magnetic tape exhibit an FM modulator for converting an amplitude-modulated luminance signal into an FM signal. This signal is passed to a write-head configuration, which serves to write the FM signal onto the tape. A circuit configuration outputs line signals and track signals for various synchronization measures. The track signals indicate when a new frame begins, and the line signals indicate when within such a frame the information for a new lines commences.

In order to recover the FM signal recorded, a read-head configuration is used, which scans the recorded tracks. The head gap in each head of the read-head configuration is somewhat wider than a track, so that it also scans areas of the adjacent tracks for trouble-free track correction. This leads to what is known as cross-talk. In order to reduce cross-talk, the FM signals in adjacent tracks are recorded with the aid of write heads, which are inclined against the track-direction normal by what is known as an azimuth angle, which typically measures ±6°. In spite of this feature, there remains still a small residual cross-talk effect, which is manifested, for example, by flickering, streak formation and floating edges.

In what is known as the standard playback mode for video signal recording, the errors described above are only very slight. A considerable deterioration in the picture, however, occurs in what is known as the long-play mode, in which the tape runs only at half the speed of the standard mode, meaning that twice as many tracks are written as in the standard mode. If the read heads used for playback in the long-play mode are the same as in the standard mode, then during reading of one track the two adjacent tracks are each on an average also scanned by more than half. The cross-talk interferences involved are no longer acceptable, and for this reason the long-play mode has to utilize read heads whose head gap is matched to the width of the narrower tracks. This means that a video set which offers both standard and long-play options has to exhibit a different read-head configuration for each of the modes involved. This renders such sets considerably more expensive.

The long-standing problem is accordingly how to improve the conventional recording mode further so that when the recorded signals are read the cross-talk errors occurring are still slighter than previously, so that images reproduced in the standard mode become still less disturbed and under certain circumstances it will even become possible to use standard read head configurations to read signals recorded at half the standard speed.

DESCRIPTION OF THE INVENTION

The device described in this invention for recording FM signals in helical-scan tracks of a video magnetic tape exhibits, like conventional devices, an FM modulator, a write-head configuration and a circuit configuration, which functional tools perform the tasks mentioned above. In addition, a phase shifter is provided between FM modulator and write-head configuration; this receives the line signal and the track signal, in order (dependent on the track involved and the line involved) to perform different phase shifts on the FM signals supplied by the modulator before their being recorded on the tape. The phase shifter is designed so as to ensure the following phase shifts:

for any line n of any track m, the phase shift is any specified first phase shift P1, for the line n+1 of the same track m, the phase shift is any specified second phase shift P2, for the line located in the following track m+1 under the line n, the phase shift is any specified third phase shift P3, and for the line located in the following track m+1 under the line n+1, a fourth phase shift P4 exhibits a value so predetermined by the other three phase shifts that the difference D between the difference D1 of the fourth and the second phase shifts (D1=P4−P2) and the difference D2 of the third and first phase shifts (D2=P3−P1) measures 180° (D=D1−D2=180°).

The device described in this invention works especially simply when as many as possible of the four phase shifts exhibit the value zero. It is therefore of advantage to design the phase shifter so as to ensure that for the first, second and third phase shifts, in accordance with the preceding definition, it in each case outputs the phase-shift value of 0°, but outputs 180° for the fourth phase shift. In other word, this means that in one track no line is subjected to a phase shift, while in the following line there is alternately a phase shift of 180° and no phase shift at all.

The phase-shift measure described will be explained using an example. A uniformly medium-bright area is to be displayed over the entire screen of a playback set. With a conventionally recorded signal, cross-talk errors will mean that, for example, in the upper quarter of the image in a first field the brightness will rise slightly from line to line compared with the original brightness. In the next quarter, it will drop back to the original value line by line, and then in the third quarter will drop line by line by a small difference even below the brightness of the original lines, and will rise again in the last quarter up to the original brightness. In every further field, this area brightening and darkening may be differently located. In temporal and topographical average, the brightness of the reproduced image corresponds to the brightness of the original. The temporal alteration of the area brightness changes is clearly perceptible to the human eye, e.g. as a streaky noise or moiré effect.

If, instead, an FM signal recorded with a device in accordance with this invention is played back and reproduced, the brightness is averaged out temporally and topographically from line to line. For the phase shift performed during recording ensures that when the brightness of a reproduced line is (due to cross-talk) somewhat increased over the brightness of the original line, then the brightness of the reproduced following line is reduced by the same amount. Both the temporal and the topographical averaging are thus enormously reduced; averaging is no longer generated over a large area for the duration of several images, but immediately from line to line.

In a corresponding way, errors are averaged out from line to line, e.g. those occurring at edges between areas of different brightness; this is clarified further below.

As has already been explained above, cross-talk errors are only small in the standard mode. When FM signals are reproduced which have been recorded with a device in accordance with this invention, there are consequently only very slight counterbalanced brightness fluctuations due to cross-talk from line to line in the image being reproduced. These slight alternating brightness fluctuations from line to line against the original are no longer noticeable even at a relatively short distance of observation. If, however, a signal is played back which was recorded only at half tape speed (long-play mode), the cross-talk signal is stronger, and for this reason the alternating brightening and darkening from line to line is resolved by the human eye at a short distance of observation. In order to make possible a short distance of observation even in this case of more marked cross-talk, a further development of the device described in this invention possesses a circuit which averages out the relatively slight brightening and darkening phenomena alternating from line to line and caused by cross-talk. Larger brightness changes from line to line, however, are reproduced as such, since as a rule they correspond to brightness changes in the original. The further-developed device possesses for this purpose a time-delay element, which delays the demodulated signal received, i.e. the amplitude-modulated luminance signal thus formed by the duration of a line. One delayed and one non-delayed luminance signal are both added and subtracted from each other, and the difference signal is added to the addition signal after processing.

The recording of FM signals with the device described in this invention thus ensures that when reproducing the signals so recorded, cross-talk errors are averaged out from line to line, and no longer over relatively large areas and time periods. In trials, astonishing improvement in picture quality was achieved. Attempts were therefore made to perform recording at only a third of standard tape speed. In this case, three recording tracks lie on the width of one conventional standard track. With such narrow recording, the cross-talk is so marked even when using a read head for long-play mode that it was not possible to achieve a serviceable picture with signals recorded in the conventional way. If, however, the phase-shifting measure described above was used during recording, an excellent picture was obtained. The recording device as described in this invention accordingly makes it possible for the first time to record FM signals at a third of standard tape speed in such a way as to achieve a good-quality picture during playback.

BRIEF DESCRIPTION OF THE FIGURES

FIG. 2 schematic diagram of three tape tracks, each with several lines, which were recorded with different phase shifts against the FM signal from an FM modulator;

FIG. 3 diagram in accordance with that of FIG. 2, but with a different configuration of phase shifts of 0° and 180°;

FIG. 4 diagram to illustrate a relationship which must be generally valid for phase shifts performed by the circuit in accordance with FIG. 1;

FIG. 5 diagram of phase shifts for pairs of successive lines in three tracks below each other, to illustrate the general relationship in accordance with FIG. 4;

FIG. 6 diagram of pairs of adjacent lines in two tracks below each other, with locally varying phase shifts in the upper lines;

FIG. 7 schematic diagram of a screen with two image areas of differing brightness;

FIG. 8 diagram with luminance signals belonging to an image in accordance with FIG. 7, with FIG. 8 in its lower section having tracks recorded with lines in which the FM signals are recorded from which the luminance signals shown at the top of FIG. 8 are obtained;

FIG. 10 diagram of a screen with three image areas of differing brightness levels.

WAYS TO IMPLEMENT THE INVENTION

All mentioned embodiments are explained on the basis of the PAL-VHS standard.

Figure 1:
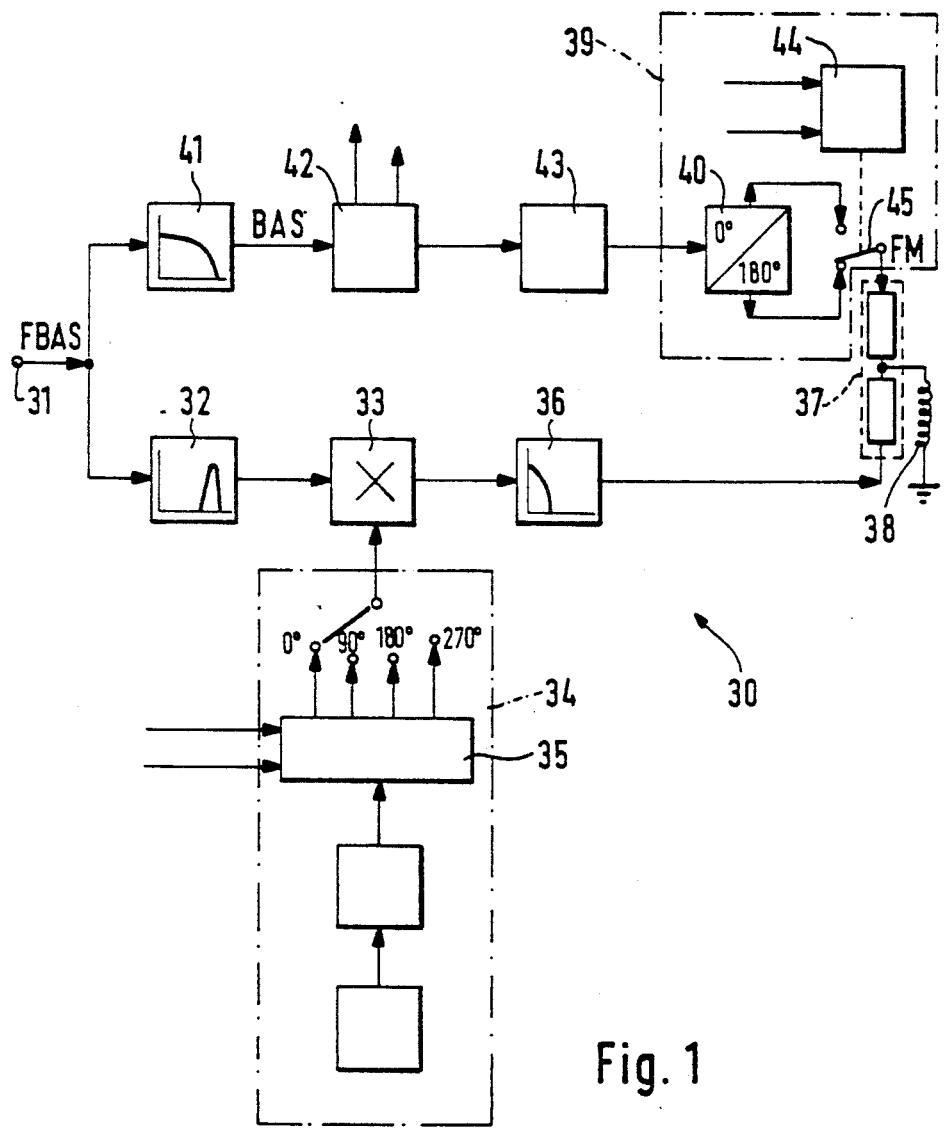
FIG. 1 block diagram of a recording device for FM signals which are subjected to phase shifts.

An FBAS signal is fed to the recording circuit (30) in accordance with FIG. 1 via an input connection (31). As one reasonably skilled in the art would appreciate, an FBAS signal is the standard European television signal, having an "F-signal" component as a chrominance signal and a "BAS" component as a luminance signal. The BAS content is processed in the upper part of the circuit and the F content in the lower part. The lower part is conventionally designed. The F-signal is extracted from the FBAS signal by an F-high-pass filter (32) and is mixed in a converter (33) with a frequency from a converter frequency oscillator (34). This latter possesses a logic (35) which ensures that the converter frequency signal is outputted with one of four specified phases, in dependence on the track and line currently applying. A track signal (SSig) and a line signal (ZSig) indicate which track and which line apply in each case. The converted signal is passed to a chroma low-pass filter (36), which outputs a chroma signal to an addition circuit (37), in which the chroma signal is added to the FM signal coming from the upper part of the circuit. The added signal is outputted to a head-coil configuration (38) in a write-head configuration.

The upper part of the recording circuit (30) is also largely identical to conventional circuits, apart from a phase inverter (39). The BAS signal is separated from the FBAS signal by a BAS low-pass filter (41), and is passed to a signal processing circuit (42), which processes the BAS signal in the conventional way before it is fed to an FM modulator (43). The signal processing circuit (42) outputs track signal (SSig) and line signal (Zsig) already mentioned.

Between the FM modulator and the addition circuit (37) is located that part of the circuit which distinguishes this circuit from conventional circuits. For the FM signal is passed to the addition circuit (37) not directly from the FM modulator (43), but via the phase inverter (39). This latter consists in the block diagram in accordance with FIG. 1 of a phase inverting element (40), a switching logic (44) and a switch (45) switched by the latter. The switching logic (44) operates the switch (45) in dependence on the track and line currently present. The information on track and line is fed in via the track signal (SSig) and the line signal (ZSig).

Before explaining the effect of phase-inverted recording of FM signals with reference to FIGS. 7 and 8, various phase shifts (with reference to FIGS. 2 to 6) capable of being performed during recording will first be explained.

FIG. 3 shows three helical-scan tracks located below each other. For simplicity's sake, the track are shown running horizontally, thus presupposing an inclined tape (not drawn). The tracks located below each other are marked u and g respectively, to stand for "odd" and "even" respectively (in German). It is optional which track is designated as "odd" and which as "even". In each of the three tracks, four successive lines are shown, each of them located precisely below one another. The magnetic lines recorded are inclined at an azimuth angle of 6° to the track-direction normal. A read-head gap (46) is reading the line (n) in the middle, "even" track. It is aligned in parallel to the direction of the magnetic lines on this track, and thus detects field alterations from one magnetic line to the other on the middle track with full strength. Field alterations on the adjacent tracks (into which the read-head gap (46) projects), however, are read with reduced strength only. If the read-head gap (46) cuts across several magnetic lines, the cross-talk information largely cancels itself out; a residue, however, remains, and leads to interference in the picture.

In FIG. 2, degree particulars are entered in the lines, namely 0° and 180°. This means phase shifts against the FM signal as outputted by the FM modulator (43). Phase shifts in other figures should be interpreted correspondingly, e.g. for phase shifts P1—P4 in FIG. 4, or for phase shifts of e.g. 10 or 250° in FIG. 5.

It must be noted at this point that the absolute phase position of the FM signal is unknown. Apart from accidental coincidences, the phase of the FM signal is different in each line, even in the case of identical image content for all lines. If the phase is, for example, 0° at the beginning of an appropriately selected line, the phase will generally exhibit a different value at the beginning of the next line. The reason for this is that the oscillator in the FM modulator (43) is oscillating continuously, so that the phase of the oscillation at the beginning of a line coincides exactly with the phase at the end of the preceding line. Since, however, it is a random chance that an integer number of oscillations fits into the time between beginning and end of a line, the phase at the end of a line will as a rule have a different value than at the beginning of the same line. The phase at the beginning of the next line will accordingly also have a different value.

One of the consequences of the fact that the phase position of the FM signal is unknown is that it is immaterial when the phase inverter (39) actually inverts the phase. In the embodiments it is assumed that this is done at the beginning of each line, or to put it more precisely, in the invisible part of the line. If an inverter were used which could switch over the phase without any switch-over interference, then switching could certainly be performed at any point in the visible part of a line. It is only important that the system switches "from line to line", i.e. that during switching a time period is adhered to which corresponds to the duration of a line, i.e. a duration of 64 us in the PAL standard. The fact that it is immaterial when within a line the system switches means that track offset errors have no effect, but on the contrary can be optimally compensated. Track offsets can be either unintentional or system-inherent, the latter applying to recordings in long-play mode. There the lines begin in a track which lies below another one, always one quarter of the line duration after the lines in the upper of the two tracks.

As can be seen from FIG. 1, a phase shift is also performed in processing the F-signal (which is done in the conventional way). Here, however, the phase is related precisely to the phase of the burst signal which is outputted at the beginning of every line. When the F-signal thus processed is reproduced, the shifted phase must be shifted back into precise correlation with the burst signal. Processing is then performed with the aid of a time-delay configuration, which ensures that phase shifts due to cross-talk cancel each other out precisely. If, however, the FM signal recorded with phase shifts is being reproduced, no further processing is necessary in order to achieve the main effect of cross-talk reduction. If brightening and darkening occurring from line to line during playback due to cross-talk interference are also to be avoided, then for this purpose a time-delay circuit is used, which, however, works differently to the circuit familiar from processing of the F-signal (or chroma signal). For there is no need for a previous precisely phase-correlated shift-back of phases which were shifted forwards during recording, and there is no superimposition of a delayed and a non-delayed frequency-modulated chrominance signal in order to mutually cancel out phase shifts due to cross-talk as well; on the contrary, the demodulated signals are subjected to processing in the time-delay circuit, i.e. signals which no longer contain any phase information.

FIG. 2 relates to the case of a recording in which the "odd" tracks phase shifts of alternately 0° and 180° were performed. No phase shift was performed in the "even" tracks. FIG. 3 is distinguished from this by the fact that in each of the "even" lines there is a phase shift of 180°. Both in FIG. 2 and in FIG. 3, a group of four adjacent lines is emphasized by thicker borders. The difference in phase shifts against the FM signal from the FM modulator is in each case 0° for the two front lines above one another in the emphasized boxes. The difference in the corresponding phase shifts for the rear lines above one another is in both case 180°. The difference between these two differences is likewise 180°. This result of the last difference is valid for each and every block formed of four lines in four quadrants.

FIGS. 2 and 3 relate to the special case that phase shifts of 0° or of 180° against the FM signal from the FM modulator (43) are performed. FIG. 4 represents contrariwise the general case, where in an upper track (m) the FM signal for a randomly selected line (n) exhibits a phase shift (P1) against the FM signal from the FM modulator (43). For the following line (n+1) in the same track (m), the phase shift (P2) applies; for the front line (n) in the track below (m+1) the phase shift (P3) applies, and for the following line (n+1) in the lower track (m+1) the phase shift (P4) applies. The desired picture-improvement effect is always attained when the following relationship is valid:

$$D = D1 - D2 = (P4 - P2) - (P3 - P1) = 180°$$

FIG. 5 illustrates this relationship by an example where in an upper track the phase shifts of the recorded signal against the FM signal from the FM modulator (43) for three randomly taken lines measure 10°, 30°, and 320°. In the following track, the corresponding phase shifts for the three lines located below the lines in the upper track are 50°, 250°, and 280°. In another track, the phase shifts for the signals to the three corresponding lines are 20°, 100°, and 250°. The above condition applies to all randomly taken blocks of four lines.

As has already been explained above, the fact that, for example, the phase is to be inverted in a track from line to line does not necessarily mean that the inversion must in each case be performed at the beginning of the line. It can, on the contrary, be performed at any point in the invisible part of the line, but there must necessarily be a temporal distance corresponding to the line duration. The consequence of this fact is that the four lines in a block of four do not have to be located in pairs precisely below one another, as shown in FIG. 4, but that the line pairs in the two tracks can be offset against each other in any way at all. In order to achieve the picture-improvement effect, however, the phase-shift-difference relationship given above should be applied to those line pairs in adjacent tracks which overlap looking in the track direction, i.e. to those lines shown which are identically or adjoiningly numbered.

The fact that (when the phase-shift condition is adhered to) care need only be taken to have a clock pulse of line duration makes it possible to have a phase shift function of the sort illustrated in FIG. 6. The four lines in the block of FIG. 6 are comparable with the middle lines in the top two tracks in FIG. 2. The two lower lines were recorded with a phase shift of 0° against the FM signal from the FM modulator (43). In the two upper lines in FIG. 2, however, the first line was recorded with a phase shift of 0° and the second with a phase shift of 180°. FIG. 6 modifies this procedure to the extent that in the first upper line a continuous shift is performed from the beginning to the end of the line, starting with 0° and finishing with 180°, while in the following line, from its beginning to its end, the shift is reversed, from 180° back to 0°. The phase shift between corresponding points of adjacent lines is 180° in this case as well.

The fact that when the phase-shift conditions are adhered to it is only necessary to ensure a time cycle of line duration makes it possible to have a phase shift of the type illustrated in FIG. 6. The four lines in the block of FIG. 6 are comparable to the middle lines in the top two tracks in FIG. 2. The two bottom lines were recorded with a phase shift of 0° against the FM signal from the FM modulator (43). In the case of the top lines in FIG. 2, contrariwise, the first line was recorded with a phase shift of 0° and the second with a phase shift of 180°. FIG. 6 modifies this procedure as follows: in the first top line, from the beginning to the end of the line, the phase is steadily shifted from 0° to 180°, and then in the following line (from its beginning to its end) is shifted back from 180° to 0°. The phase shift between corresponding points of adjacent lines measures 180° in this case as well.

As already explained above, for simplicity's sake the system utilizes phase shifts of 0° and 180°, and phase shifts (here phase inversions) are performed in the invisible part of a line. The inversion of the phase can be performed simply by switchover, but this may during playback impair the function of the FM demodulator used there, due to switchover interference. This can, for example, be eliminated by placing the switchover in a time period representing part of the time period of an easily simulatable signal. When the signal is read, this part with the switchover interference is then extracted and simulated. Switchover interference can be avoided completely if the phase is shifted, instead of switched, e.g. by having one of the signals with a specified frequency offset in the invisible section by a somewhat higher frequency until the desired phase shift is achieved (preferably 180°).

The effect of the phase-shift measures discussed will now be explained on the basis of FIGS. 7 and 8.

FIG. 7 shows in schematic form a screen with on the left a large area with grey level G and on the right a smaller area with white level W. At the top of FIG. 8, the behaviour for the associated luminance signal of the original picture is drawn in a continuous line. The luminance signal exhibits grey level for a specified time period, and thus for a specified line-length part. For the rest of each line, it then jumps to the white level W.

At the bottom of FIG. 8, two tracks are shown, designated as "odd-number" track (u) and "even-number" track (g). In each track there are four lines (n to n+3). The lines in the lower, "even" track are shifted somewhat to the left (i.e. earlier) against the lines in the upper track. For the first three lines in each case (n to n+2), conventional recording is assumed. In the fourth line (n+3) of the lower column, however, the phase is inverted. The different levels of the luminance signal are recorded on the tracks as FM signals of different frequencies. A first frequency (f1) corresponds to the grey level (G) and a higher second frequency (f2) corresponds to the white level. The boundary between the two areas of each line with different frequency recordings is entered as a broken line in the track representation.

If the lines of all tracks were to be precisely below one another, and if the recording frequencies for the grey level (G) and the white level (W) were always precisely f1 and f2 respectively, there would be no signal falsification due to cross-talk. The read-head gap (46) would still be scanning not only the track being read, e.g. the upper track (u) in FIG. 8, but also the tracks above and below it (in FIG. 8 track g), but the signals being read would coincide precisely with those of the track actually being scanned, so that the cross-talk effect would not lead to any error. But such ideal recording conditions are not possible in practice. The FM modulator (43) does not continuously output exactly the same frequency (e.g. the frequency f1) for a specified luminance level, but the outputted frequency drifts to both sides around the frequency actually desired. In the example shown in FIG. 8, assume that the frequency for the lines taken from the upper "odd" track (u) is exactly correct, but slightly increasing, so that at the end of this track it is already at a value somewhat above f1. When finally in the bottom track (g), those lines ar reached which lie below the lines taken in the upper track, the frequency will have altered by the value f. We thus now have the frequencies f1+delta f and f2+delta f. If this somewhat increased frequency is detected by the cross-talk, the result will be that the image being shown is brighter than the original. Besides this basic frequency-drift error, there will also always be a track-offset error, which in FIG. 8 is represented by the lower track being offset somewhat to the left of the upper one, as already mentioned. This track offset results in the read-head gap (46) (FIG. 2) already detecting the grey-white transition by partial reading of the lower track while actually scanning the upper track in FIG. 8, before detecting the information on level change (from frequency change) from the track actually being read. This cross-talk leads to light-dark disturbances along vertical edges. The reproduction of vertical edges is impaired by yet another effect, which involves the floating phase of the FM signal. To explain this effect: let it be assumed that the signal with the frequency (f1) in the line (n) of the upper track in FIG. 8 has its zero passage just at the frequency-change boundary (broken line). At demodulation, the frequency (f1) will then be detected exactly at the boundary, and the associated luminance level further retained until a frequency change is detected. This will happen at precisely the moment when the signal with frequency (f2) exhibits a first zero passage, which happens after half a wavelength of the signal with the frequency (f2). The system then switches over to the white level. Let it now be assumed that in a different line the signal with the frequency (f1) exhibits its maximum amplitude just at the boundary (marked with a broken line). The signal with the frequency (f2) then follows, beginning at maximum amplitude, so that the next zero passage already happens after a quarter of the wavelength of the signal with the frequency (f2) behind the broken-line marking. The system then already switches over to a new brightness level, which does not, however, as yet correspond to the white level, since the time period between the two last zero passages of the FM signal is made up of a first time period for the last quarter-wave of the signal of the first frequency (f1) and a second time period for the first quarter-wave length of the signal of the second frequency (f2). This means that the edge shown in FIG. 7 between the grey and white areas is continually shifted back and forth somewhat topographically and in its brightness transition.

The various errors are drawn as broken lines in the luminance-signal curves at the top of FIG. 8. When both the signal with the frequency (f1) and the signal of the adjacent line with the frequency (f1+delta f) are read through the rad-head gap, there will be a beat with a frequency of delta f. The result of this beat is that the composite signal from which the luminance signal is derived always rises and falls slowly against the midfrequency (f1), so that the brightness in the picture fluctuates accordingly around the value actually specified. The beat frequency is as a rule so low that brightness alterations extend over several lines, meaning that the picture becomes alternately somewhat brighter or darker compared with the brightness of the original, at the beat frequency. In FIG. 8 it is assumed that due to the beat the effective frequency is somewhat increased, so that for the line (n) currently being read the level G(n) for the grey area of the level is somewhat increased in relation to the level G obtaining for the original.

Correspondingly, the level for the white area is raised somewhat to a value W(n). It is further assumed that the effective frequency is currently growing due to the beat, i.e. that the increase in brightness compared to the original brightness is likewise growing. This means that the levels G(n+1), W(n+1), G(n+2) and W(n+2) for the following lines (n+1) and (n+2) are becoming progressively greater.

The broken lines in the luminance signals depicted in FIG. 8 show not only long-wave beats (of the type particularly caused by frequency drift of the modulator), but also higher-frequency beats, due among other things to the track offset mentioned above. These beats are very similar in phase and amplitude from line to line. The beat amplitudes of the luminance signals are designated for the lines (n) to (n+2) with A(n), (A(n+1), and A(n+2) respectively.

The measure performed with the device in accordance with FIG. 1 is based on the following finding: if the picture contents of successive lines and corresponding lines in successive pictures are very similar (which applies to the majority of lines), then slight deviations in the line contents (which are detected due to the cross-talk effects) will lead to beats in the signal reproduced, and thus to brightness variations. These beats can be of relatively high frequency, e.g. at edge transitions, but also of low frequency, e.g. caused by frequency drift of the modulator. The beats are caused by altering phase relationships between the signals of adjacent tracks. The phase relationships themselves are completely unknown, but it is known that (as already mentioned) the relationships of vertically adjacent line pair to vertically adjacent line pair alter only a little. If now the information for one line is read, e.g. the information for the line (n) in the upper track (u) in FIG. 8, on this signal are superimposed cross-talk signals from the previous (not shown) and the following tracks. This leads to beats with antinodes and nodes at more or less long intervals, depending on the beat frequency involved. For simplicity's sake, very low-frequency beats will be considered, in which the edges and antinodes exhibit intervals of several lines. Assume that in the line (n+2) an antinode in the beat is just being reached, leading to a brightening of the signal, represented by the high level represented by the broken line in FIG. 8. Assume that the line (n+3) in the "odd" upper track (u) is now being read. Let the information in the associated line (n+3) in the lower "even" track (g) be inverted in phase against the signal from the FM modulator. The consequence is that when the signal in track (u) are read, although there is still cross-talk with the signals in the lower track (g) and there are still beats formed, now however the antinodes of the beat are inverted in phase against those antinodes which would be present if the phase of the signal recorded in the lower track for the same line (n+3) were not inverted. But since the beat information hardly changes from line to line, the inversion of this information means that an increase in brightness in the previous line caused by the beat now causes a reduction in brightness by more or less the same amount compared with the brightness not falsified by beats. In FIG. 8 this is depicted by the brightness level for the grey area being lowered to a value G'(n+3), which lies by approximately the same amount (in fact a rather greater amount) below the level G as the signal G(n+2) lies above the grey level mentioned. This applies correspondingly for the relationship of white-level signals W'(n+3) and W(n+2) with reference to the white level (W). The rapid brightness fluctuations near the horizontal edge are also reversed, with an amplitude A'(n+3).

In general, the following statements can be made:

For lines with the same information content in an original, there will, due to recording errors, be differences in the information read from line to line; these errors from line to line, however, differ only very slightly from each other.

The errors result in more or less higher-frequency beats, which are manifested as brightness fluctuations; these brightness fluctuations hardly alter from line to line, since the beats hardly alter, since the recording errors alter only slightly from line to line.

If in a track the phase of the FM signal is imagined to be inverted against that phase which the signal first had, the frequency information for all lines of this track remains completely unaltered, but the beat in relation to the FM information in the adjacent line is inverted; this beat would lead to brightening at all points in the image at which previously there was darkening, and vice versa; if all errors over the entire screen were inverted, the picture quality would be identically poor;

However, if during recording the phase is inverted from line to line of a track, the beats will invert their phase from one to the next, thus producing from line to line alternately brightening and darkening compared with the original brightness; brightness deviations are now eliminated by averaging over two lines, resulting in still, sharp edges and still solids.

The averaging out of a somewhat brightened line (or a somewhat brightened small section of a line), e.g. at an edge with a correspondingly darkened following line or a correspondingly darkened following section of a line, need not necessarily be done with the eye. On the contrary, for this purpose a circuit can be used, of the type explained below with reference to FIGS. 9a and 9b. The use of this circuit is especially advisable in cases where cross-talk errors are relatively strong, which is the case when cassettes recorded in long-play mode are played back with a standard head, or when cassettes recorded at only a third of standard tape speed are played back with a long-play head.

Figure 9A:
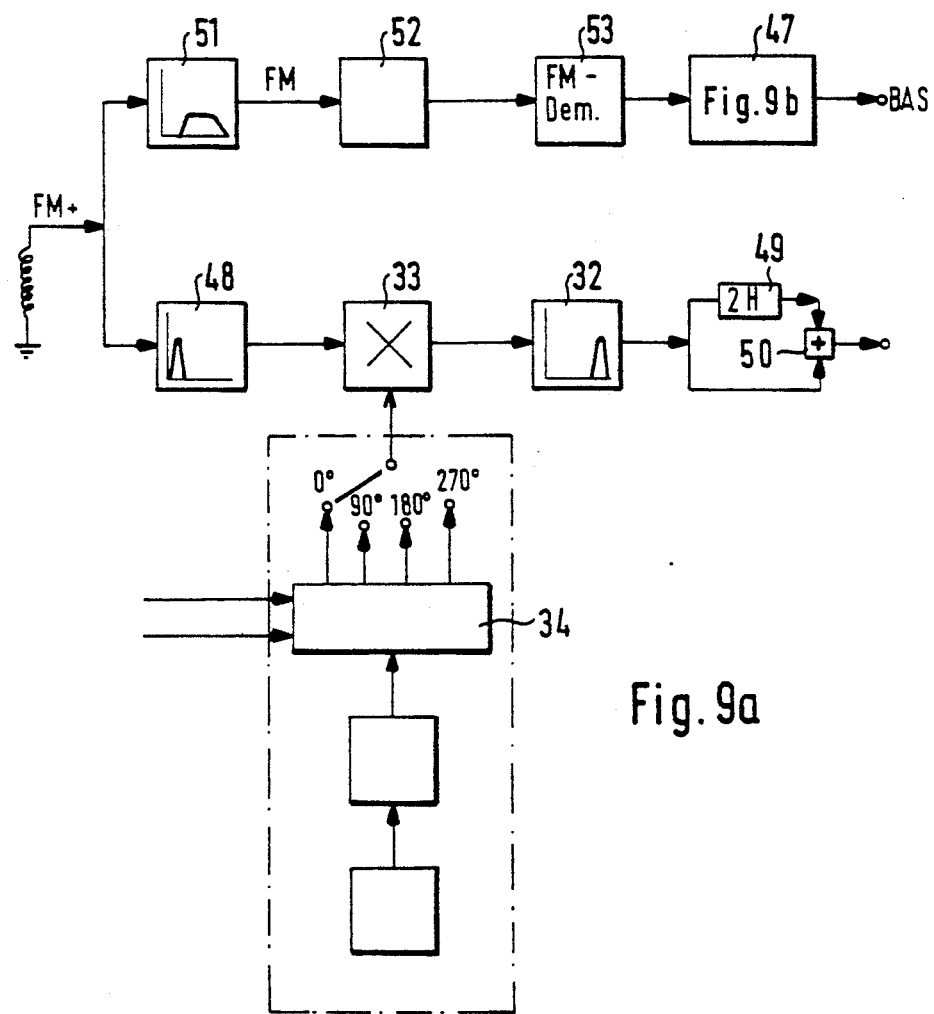
FIGS. 9a and 9b circuit for reproducing FM signals in such a way that minor differences in brightness are averaged out from line to line, whereas larger alterations in brightness are reproduced from line to line.
Figure 9B:
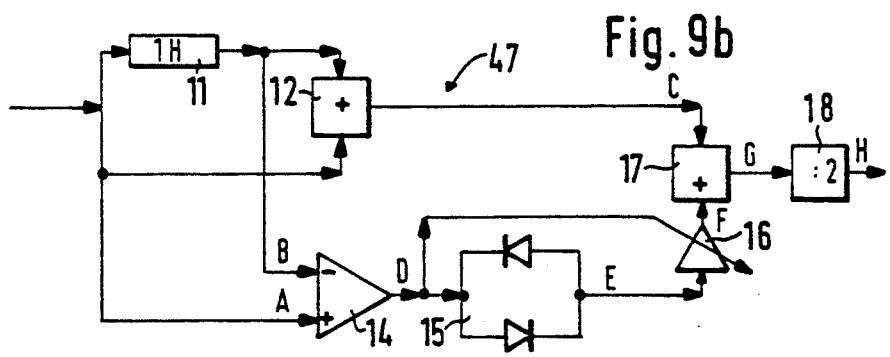

The circuit in accordance with FIG. 9a differs from circuits known from the current state-of-the-art only in the block (47) marked "FIG. 9b", namely a circuit for processing luminance signals. The circuit in accordance with FIG. 9a will accordingly be dealt with only briefly. It exhibits a top FM section and a bottom chroma section. In the chroma section are a low-pass filter (48), a converter (33), and an F-high-pass filter (32). The converter (33) receives in phase-switched mode a mixed frequency from a converter-frequency circuit (34). The output signal from the F-high-pass filter (32) is passed directly and after a time-delay via an F-time-delay element (49) to an F-addition element (50). This latter outputs an F-signal, in which cross-talk errors are averaged out due to phase compensation in the F-addition element (50).

The top FM section possesses an FM high-pass filter (51), a signal processing circuit (52) and an FM demodulator (53). This latter does not pass the amplitude-modulated BAS signal directly to a BAS output connection (54), as is the case with circuits in accordance with the current state-of-the-art, but there is a luminance processing circuit (47) connected between the demodulator and the output connection.

In accordance with FIG. 9b, the luminance processing circuit (47) exhibits the following function groups: a time-delay element (11), which delays the arriving luminance signal by the duration of one line (1H) and outputs it as the time-delayed signal (B), an addition element (12), which adds the time-delayed signal (B) and a non-delayed signal (A), and outputs the sum as addition signal (C), a subtraction element (14), which subtracts the time-delayed signal (B) from the non-delayed signal (A) and outputs the result as difference signal (D), a threshold circuit (15), which receives the difference signal (D) and as evaluated signal (E) allows to pass only those level components of the difference signal which violate either an upper threshold value (SH) or a lower threshold value (SL) (FIG. 11), an amplifier (16), which essentially raises the evaluated signal (E) to that level which it had before the evaluation, and outputs it as signal (F), a second addition element (17), for adding the addition signal (C) and the amplified interference-suppressed signal (F), for outputting a processed output signal (G) to a division element (18), which halves the output signal and outputs it as a BAS signal (Signal H).

Figure 11:
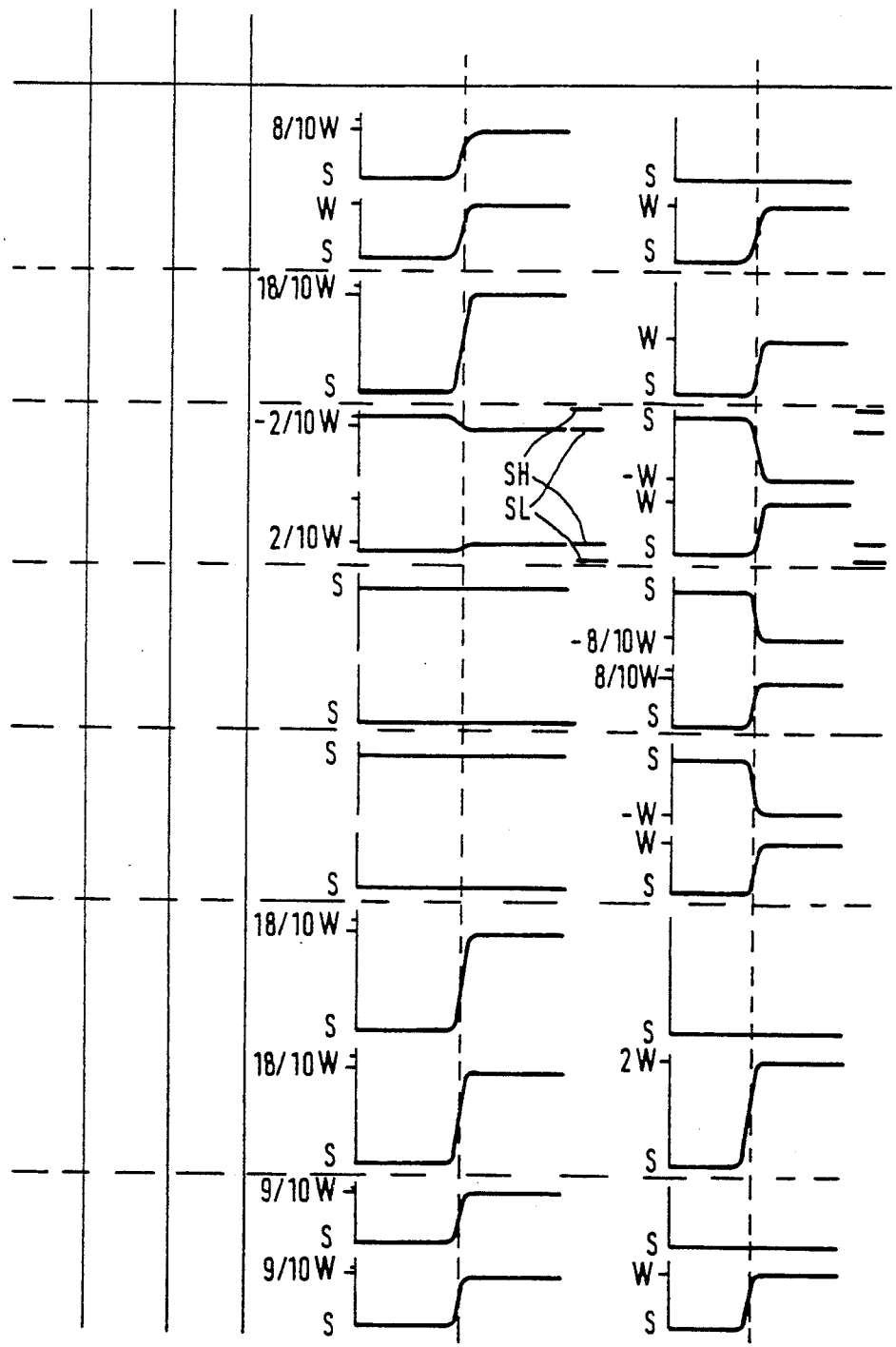
FIG. 11 sequence of time-correlated luminance signals to illustrate the circuit in accordance with FIG. 9b.

The function of the circuit in accordance with FIG. 9b will now be explained with reference to FIGS. 10 and 11. FIG. 10 is a schematic representation of a screen, in which the left-hand half of the image is completely black, the top right-hand quadrant exhibits a brightness of 9/10 of the white level, and in the bottom right-hand quadrant white and black lines are present alternately. Assume that in the top right-hand (almost white) quadrant there is an image falsification due to cross-talk errors, manifested in bright and dark lines, each of which deviates by a tenth of the brightness of the white level from the white-level brightness of 9/10 actually specified. Thus every other line exhibits of the precise white level, while the lines inbetween represent only 8/10 of the white level. This is exactly the effect which is produced when FM signals, if recorded with a device in accordance with FIG. 1, are played back on a conventional device, i.e. one not exhibiting the circuit in accordance with FIG. 9b between the FM demodulator (53) and the BAS output connection (54). But if this circuit is provided, the above-mentioned stripes with alternately white level and 8/10 of white level will not occur; all lines in the top quadrant will show the averaged original brightness of 9/10 of white level. The black and dark lines in the bottom right-hand quadrant, however, are not averaged out into a uniformly grey area. FIG. 9b, plus the associated diagrams for signals A-H (shown in FIG. 11), show how this is done. In FIG. 11, signals D-H carry an additional designation of "g" or "u". "Dg", for example, means that the signal involved here is the signal (D), as formed when the non-delayed signal (A) is the one for an "even-number" line. "Du" is correspondingly the signal (D) in a case where the non-delayed signal (A) belongs to an "odd-number" line. The luminance signal curves for "even" and "odd" lines are drawn in the top four diagrams of FIG. 11.

The addition element (12) ensures that the brightness of pairs of successive lines is averaged out. Nothing further relating to this averaging-out is altered if the brightness difference, or to put it more precisely the difference of the associated luminance signal amplitudes lies within the range between the above-mentioned thresholds SH and SL. For then in the second addition element (17) nothing is added to the addition signal (C), since then the amplified, interference-suppressed signal (F) has the value 0. If, however, the brightness difference between adjacent lines exceeds a defined threshold, a difference signal is produced, which in the second addition element (17) is added to the averaged addition signal (C), and thus cancels out the averaging function once more. Alternating black and white lines, and also horizontal transitions between black and white areas will accordingly be reproduced exactly.

What is claimed is:

1. A device for recording a video signal consisting of a sequence of picture lines in the helical-scan track of a video magnetic tape, comprising a signal processing circuit (42) receiving an amplitude-modulated luminance signal and for outputting a line signal characterizing the beginning of a picture line and a track signal characterizing the beginning of a recording in the helical-scan track, an FM modulator (43) for converting the amplitude-modulated luminance signal into an FM luminance signal, a phase inverter (39) connected to the FM modulator (43) and the signal processing circuit (42) and providing a signal to write-head configuration (38), the phase inverter containing a switching logic (44) that is controlled by the line signal and the track signal and that controls a line-dependent and track-dependent phase shift of the FM luminance signal produced in the FM modulator in a sequence of phase shifts imposed by the switching logic (44), the switching logic (44) generating a phase shift representative of each element of a phase shifting matrix group (P1, P2, P3, P4) made up of two adjacent picture lines (n, n+1) of two adjacent helical-scan tracks (m, m+1), the phase shifts being generated to satisfy the following relationship;

a total phase shift difference D equals a first phase shift difference D1 minus a second phase shift difference D2, where the first phase difference D1 equals a phase shift P4 of the second picture line (n+1) of the second helical-scan track (m+1) minus a phase shift P2 of the second picture line (n+1) of the first helical-scan track (m) so that D1=P4−P2 in the phase shifting matrix group (P1, P2, P3, P4), and the second phase shift difference D2 equals a phase shift P3 of the first picture line (n) of the second helical-scan track (m+1) minus a phase shift P1 of the first picture line (n) of the first helical-scan track (m) in the phase shifting matrix group (P1, P2, P3, P4), and where D=D1−D2=180°.

2. A device in accordance with claim 1, characterized in that the switching logic (44) produces a sequence of phase shifts such that shifting of a phase occurs only in every other helical-scan track and that the shifting takes the form of a phase inversion from one picture line to the next in this helical-scan track.

3. A video recording device for recording and reproducing a video signal consisting of a sequence of picture lines in the helical-scan track of a video magnetic tape having a device for recording the video signal, including:

a signal processing circuit (42) receiving an amplitude-modulated luminance signal and for outputting a line signal characterizing the beginning of a picture line and a track signal characterizing the beginning of a recording in the helical-scan track, an FM modulator (43) for converting the amplitude-modulated luminance signal into an FM luminance signal, a phase inverter (39) connected to the FM modulator (43) and the signal processing circuit (42) and providing a signal to write-head configuration (38), the phase inverter containing a switching logic (44) that is controlled by the line signal and the track signal and that controls a line-dependent and track-dependent phase shift of the FM luminance signal produced in the FM modulator in a sequence of phase shifts imposed by the switching logic (44), the switching logic (44) generating a phase shift representative of each element of a phase shifting matrix group (P1, P2, P3, P4) made up of two adjacent picture lines (n, n+1) of two adjacent helical-scan tracks (m, m+1), the phase shifts being generated to satisfy the following relationship;

a total phase shift difference D equals a first phase shift difference D1 minus a second phase shift difference D2, where the first phase difference D1 equals a phase shift P4 of the second picture line (n+1) of the second helical-scan track (m+1) minus a phase shift P2 of the second picture line (n+1) of the first helical-scan track (m) so that D1=P4−P2 in the phase shifting matrix group (P1, P2, P3, P4), and the second phase shift difference D2 equals a phase shift P3 of the first picture line (n) of the second helical-scan track (m+1) minus a phase shift P1 of the first picture line (n) of the first helical-scan track (m) in the phase shifting matrix group (P1, P2, P3, P4), and where D=D1−D2=180°;

and a device for reproducing the video signal recorded on the video magnetic tape with an FM demodulator (53) that converts the FM luminance signal filtered from a read video signal into an amplitude-modulated luminance signal, characterized in that a luminance signal processing circuit (47) is arranged downstream of the output of the FM demodulator (53) and contains;

a time delay element (11) for retarding the amplitude-modulated luminance signal by the duration of a picture line into a retarded luminance signal, a first adder element (12) for adding the retarded amplitude-modulated luminance signal to the unretarded amplitude-modulated luminance signal and for outputting the addition signal thus formed, a subtractor element (14) for subtracting the retarded amplitude-modulated luminance signal from the unretarded amplitude-modulated luminance signal and outputting a difference signal thus formed, a pass-threshold circuit (15) for outputting a weighted signal, where the pass-threshold circuit (15) outputs the difference signal formed by the subtractor element (14) as the weighted signal only when the difference signal exceeds an upper threshold value of the pass-threshold circuit (15) or falls below a lower threshold value of the pass-threshold circuit (15), and a second adder element (17) for adding the weighted signal to the addition signal and outputting an output signal.

4. A device (30) for recording a video signal consisting of a sequence of picture lines n, n+1 in the helical-scan tracks m, m+1 of a video magnetic tape, comprising
- a signal processing circuit (42) receiving an amplitude-modulated luminance signal and for outputting a line signal characterizing the beginning of a picture line, a track signal characterizing the beginning of a recording in a helical-scan track,
- an FM modulator (43) for receiving said amplitude-modulated luminance signal and converting it into an FM luminance signal,
- a write-head configuration (38) for writing the FM luminance signal, and
- a phase inverter (39) connected between the FM modulator (43) and the write-head configuration (38), and having a switching logic means (44) for receiving the line signal and the track signal from the signal processing circuit (42),
- the switching logic (44) generating phase shifts P1, P2, P3, P4 representing a series of phase shifting matrix groups defined by adjacent picture lines (n, n+1) and adjacent helical-scan tracks (m, m+1), so that for any three given phase shifts P1, P2 and P3, the switching logic (44) generates the fourth phase shift P4 to satisfy the following relationship:

$$D = D1 - D2 = (P4 - P2) - (P3 - P1) = \overline{180°},$$

where a first phase shift difference D1 equals a fourth phase shift P4 of the second picture line (n+1) of the second helical-scan track (m+1) minus a phase shift P2 of the second picture line (n+1) of the first helical-scan track (m), where a second phase shift difference D2 equals a phase shift P3 of the first picture line (n) of the second helical-scan track (m+1) minus a phase shift P1 of the first picture line (n) of the first helical-scan track (m).

5. A device in accordance with claim 4, characterized in that the switching logic (44) of the phase inverter (39) produces a sequence of phase shifts such that shifting of a phase occurs in every other helical-scan track and that the shifting takes the form of a phase inversion from one picture line to the next in this helical-scan track.

* * * * *